(12) United States Patent
Ogawa

(10) Patent No.: US 12,299,994 B2
(45) Date of Patent: *May 13, 2025

(54) INFORMATION PROCESSING APPARATUS, CONTROL METHOD, AND PROGRAM

(71) Applicant: NEC Corporation, Tokyo (JP)

(72) Inventor: Takuya Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 18/241,770

(22) Filed: Sep. 1, 2023

(65) Prior Publication Data

US 2023/0410522 A1  Dec. 21, 2023

Related U.S. Application Data

(63) Continuation of application No. 17/482,123, filed on Sep. 22, 2021, which is a continuation of application
(Continued)

(30) Foreign Application Priority Data

Mar. 31, 2017 (JP) .................................. 2017-070824

(51) Int. Cl.
*G06K 9/00* (2022.01)
*G06V 20/40* (2022.01)
(Continued)

(52) U.S. Cl.
CPC .............. *G06V 20/53* (2022.01); *G06V 20/40* (2022.01); *G06V 40/20* (2022.01)

(58) Field of Classification Search
CPC ........... G06K 9/00778; G06K 9/00335; G06K 9/00711; G06K 9/2054
See application file for complete search history.

(56) References Cited

U.S. PATENT DOCUMENTS

| 2011/0228984 A1* | 9/2011 | Papke | G06V 20/52 |
| | | | 382/103 |
| 2011/0231419 A1* | 9/2011 | Papke | G06F 16/784 |
| | | | 707/769 |

(Continued)

FOREIGN PATENT DOCUMENTS

| JP | 11-164040 A | 6/1999 |
| JP | 11-175694 A | 7/1999 |

(Continued)

OTHER PUBLICATIONS

International Search Report for PCT/JP2018/012784 dated Jun. 12, 2018 [PCT/ISA/210].

(Continued)

*Primary Examiner* — Fayyaz Alam
(74) *Attorney, Agent, or Firm* — Sughrue Mion, PLLC

(57) ABSTRACT

An information processing apparatus of the present invention detects a queue (20) of objects from video data (12). Further, the information processing apparatus of the present invention generates element information using a video frame (14) in which the queue (20) of objects is detected. The element information is information in which an object area (24) in the video frame (14) occupied by the object (22) included in the queue (20) of objects is associated with an attribute of the object (22). Furthermore, the information processing apparatus of the present invention detects a change in the queue (20) of objects based on the element information and the detection result of the object to video frame (14) generated after the video frame (14) in which the element information is generated. Then, the information processing apparatus of the present invention generates element information for the queue (20) of objects in which a change is detected to update the element information used later.

9 Claims, 15 Drawing Sheets

Related U.S. Application Data

No. 16/498,949, filed as application No. PCT/JP2018/012784 on Mar. 28, 2018, now Pat. No. 11,151,389.

(51) Int. Cl.
*G06V 20/52* (2022.01)
*G06V 40/20* (2022.01)

(56) References Cited

U.S. PATENT DOCUMENTS

| | | | | |
|---|---|---|---|---|
| 2015/0278608 | A1* | 10/2015 | Matsumoto | G06V 40/23 348/143 |
| 2016/0224845 | A1* | 8/2016 | Gyger | G06V 20/53 |
| 2018/0061081 | A1* | 3/2018 | Nagao | G06V 20/53 |

FOREIGN PATENT DOCUMENTS

| | | |
|---|---|---|
| JP | 2001-291144 A | 10/2001 |
| JP | 2005-216217 A | 8/2005 |
| JP | 2005-242896 A | 9/2005 |
| JP | 2005-316582 A | 11/2005 |
| JP | 2007-317052 A | 12/2007 |
| JP | 2008-519567 A | 6/2008 |
| JP | 2010-130383 A | 6/2010 |
| JP | 2011-96140 A | 5/2011 |
| JP | 2013-109395 A | 6/2013 |
| JP | 2015-215787 A | 12/2015 |

OTHER PUBLICATIONS

Shirazi, Mohammad Shokrolah, and Brendan Morris. "Vision-based vehicle queue analysis at junctions." 2015 12th IEEE International Conference on Advanced Video and Signal Based Surveillance (ACSS). IEEE, 2015. (Year: 2015).

Lu, Yina, et al. "Measuring the effect of queues on customer purchases." Management Science 59.8 (2013): 1743-1763. (Year: 2013).

* cited by examiner

INFORMATION PROCESSING APPARATUS, CONTROL METHOD, AND PROGRAM

CROSS REFERENCE TO RELATED APPLICATIONS

This application is a continuation of U.S. application Ser. No. 17/482,123, filed Sep. 22, 2021, which is a continuation of U.S. application Ser. No. 16/498,949, filed Sep. 27, 2019, which issued as U.S. Pat. No. 11,151,389, which is a National Stage of International Application No. PCT/JP2018/012784, filed on Mar. 28, 2018, which claims priority from Japanese Patent Application No. 2017-070824, filed on Mar. 31, 2017, the contents of all of which are incorporated herein by reference in their entirety.

TECHNICAL FIELD

The present invention relates to an information processing apparatus, a control method, and a program.

BACKGROUND ART

A technique for detecting an object queue such as people from images and managing the queue has been developed. For example, Patent Documents 1 to 3 disclose a technique for assuming that a queue is formed by all objects of interest detected from an image, and estimating a waiting time of the queue by counting the number of the objects of interest included in the image. Patent Document 4 discloses a technique for detecting objects aligned in a straight line as one queue. Patent Document 5 discloses a technique for detecting a queue from an image by regarding an area within a installed marker as an area where a queue can be formed.

Patent Document 6 discloses a technique for detecting a partition line of a queue (outer frame of a queue) by detecting a trajectory of movement of a person forming the queue from an image. Patent Document 7 discloses a technique for computing the movement direction for each person detected from an image, and determining a person whose movement direction is different from a predetermined direction as a person not included in a queue and excluding this person from the queue. Patent Document 8 discloses a technique for detecting that a target joins to a queue when a new target that is not in the queue remains stationary or slightly moves at a place within a predetermined distance from the tail of the queue, or remains stationary or slightly moves at a place within a predetermined interruption distance from a part of the queue other than its tail.

Patent Document 9 discloses a technique for recognizing that a group is included in a queue of people which is formed at a predetermined place to compute a waiting time of the queue based on the number of groups. Patent Document 10 discloses a technique for detecting an addition of a new person in a queue, in a case where a person not constituting the queue approaches a place where the distance from the person at the tail of the queue is within a predetermined distance and when this place is within a predetermined angle from a direction of the queue. Patent Document 11 discloses a technique for determining a queue where a customer joins among a plurality of queues, by providing a light emitting mechanism in a shopping basket that customers use, and causing the shopping basket to emit the light when the customer joins a queue.

RELATED DOCUMENT

Patent Document

[Patent Document 1] Japanese Patent Application Publication No. H11-164040
[Patent Document 2] Japanese Patent Application Publication No. H11-175694
[Patent Document 3] Japanese Patent Application Publication No. 2001-291144
[Patent Document 4] Japanese Patent Application Publication No. 2005-216217
[Patent Document 5] Japanese Patent Application Publication No. 2005-242896
[Patent Document 6] Japanese Patent Application Publication No. 2005-316582
[Patent Document 7] Japanese Patent Application Publication No. 2007-317052
[Patent Document 8] PCT Japanese Translation Patent Publication No. 2008-519567
[Patent Document 9] Japanese Patent Application Publication No. 2015-215787
[Patent Document 10] Japanese Patent Application Publication No. 2013-109395
[Patent Document 11] Japanese Patent Application Publication No. 2011-096140

SUMMARY OF THE INVENTION

Technical Problem

Present inventors have found a novel technique for detecting a change in an object queue. The present invention is made in view of the above circumstances. An object of the present invention is to provide a novel technique for detecting a change in an object queue.

Solution to Problem

An information processing apparatus according to the present invention includes 1) a queue detection unit which detects an object queue from video data, 2) a generation unit which generates element information, in which an object area which is an area in the video frame occupied by the object included in the queue is associated with an attribute of the object, by using a video frame from which the object queue is detected, and 3) a change detection unit which detects a change in the queue based on the element information and a detection result of objects to a video frame generated after the video frame in which the element information is generated.

The generation unit generates the element information for the queue in which a change is detected to update the element information that the change detection unit uses.

A control method according to the present invention is executed by a computer. The control method includes 1) a queue detection step of detecting a object queue from video data, 2) a generation step of generating element information, in which an object area which is an area in the video frame occupied by the object included in the queue is associated with an attribute of the object, by using video frame from which the object queue is detected, and 3) a change detection step of detecting a change in the queue based on the element information and a detection result of objects to a video frame generated after the video frame in which the element information is generated.

In the generation step, the element information is generated for the queue in which a change is detected to update the element information, which is used in the change detection step.

A program according to the present invention causes a computer to execute the respective steps included in the control method according to the present invention.

Advantageous Effects of Invention

According to the present invention, a novel technique is provided for detecting changes in a object queue.

BRIEF DESCRIPTION OF THE DRAWINGS

The above-described object, other objects, features, and advantages will be further clear through preferable example embodiments which will be described below and accompanying drawings below.

DESCRIPTION OF EMBODIMENTS

Hereinafter, embodiments of the present invention will be described with reference to the accompanying drawings. Also, in all drawings, the same symbols are attached to the same components, and description is appropriately omitted. In addition, unless particular description is performed, each block in each block diagram represents a configuration in function units instead of a configuration in hardware units.

First Example Embodiment

<Outline>

Figure 1:
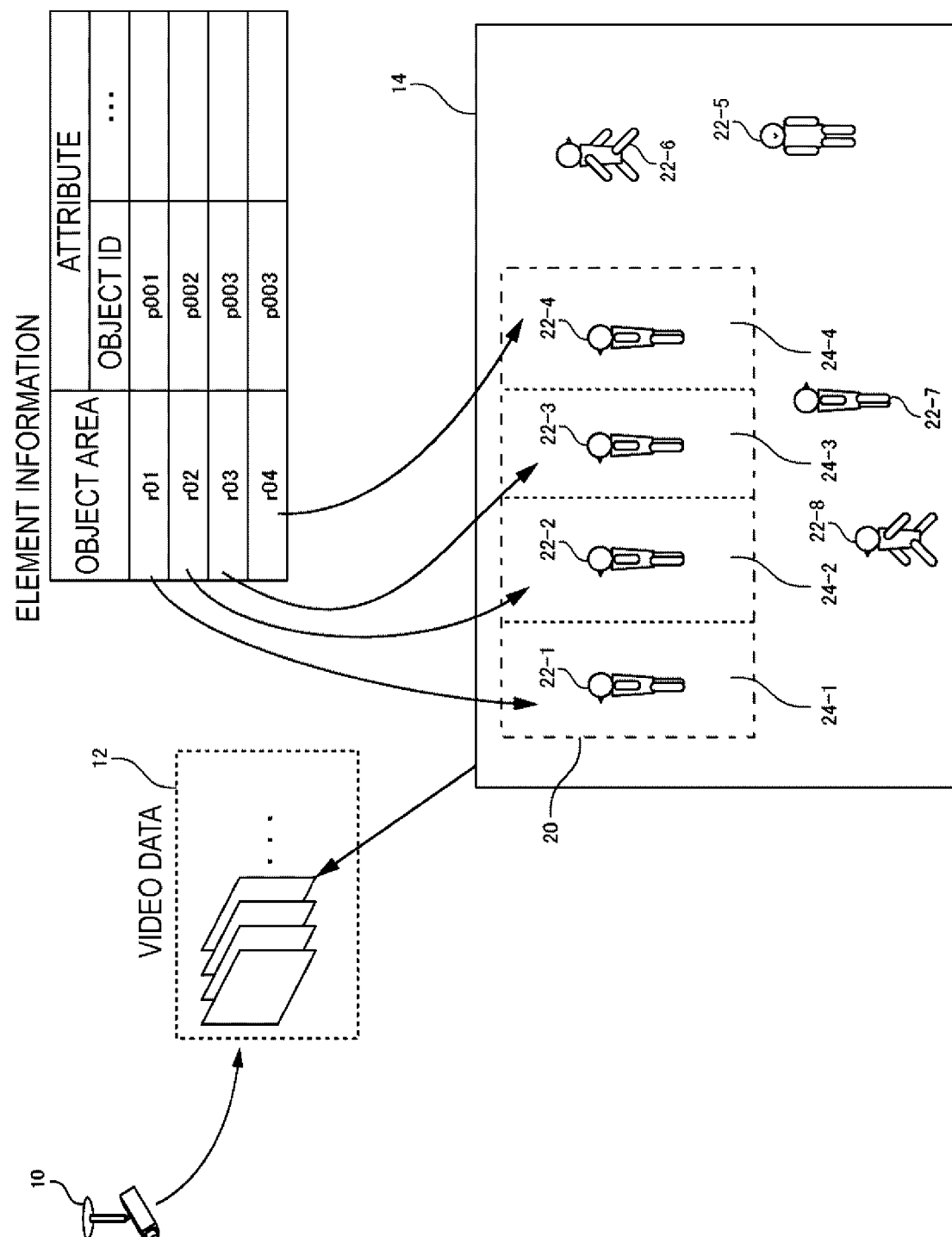
FIG. 1 is a diagram illustrating an outline of an operation of an information processing apparatus according to the first example embodiment.
Figure 2:
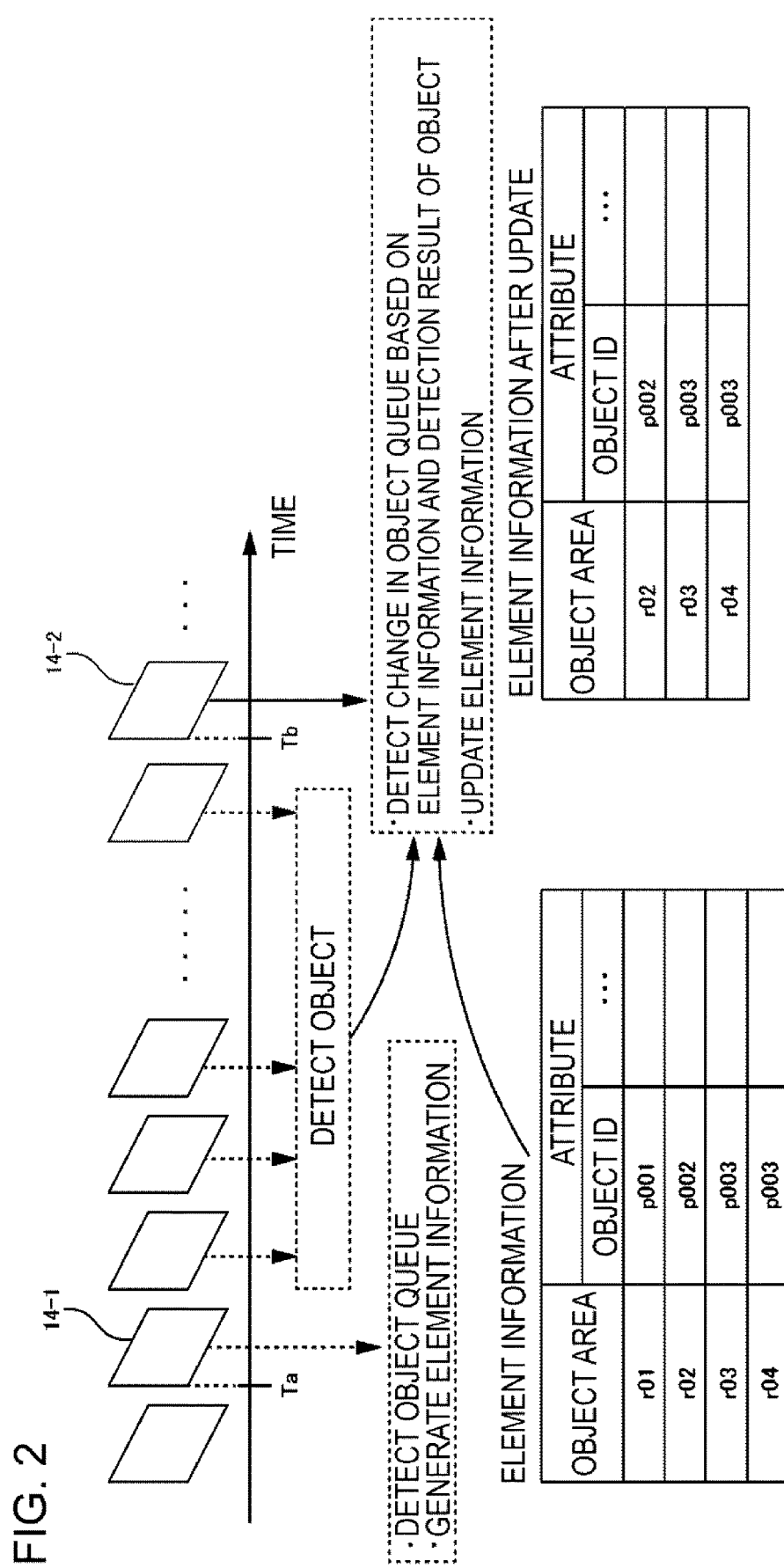
FIG. 2 is a diagram illustrating a process, in time series, in which the information processing apparatus according to the first example embodiment detects a change in an object queue.

FIGS. 1 and 2 are diagrams illustrating an outline of an operation of an information processing apparatus (information processing apparatus 2000 described later) according to the first example embodiment. The operation of the information processing apparatus 2000 described below is an example for facilitating the understanding of the information processing apparatus 2000, and the operation of the information processing apparatus 2000 is not limited to the following example. Details and variations of the operation of the information processing apparatus 2000 will be described later.

The information processing apparatus 2000 detects an object queue 20 from video data 12 generated by a camera 10. The object queue 20 is a queue formed by objects 22. In FIG. 1, among objects 22-1 to 22-8 included in a video frame 14, the objects 22-1 to 22-4 form the object queue 20. The video frame 14 is one of video frames constituting the video data 12.

Anything can be regarded as the object queue 20. For example, the object queue 20 is a queue of people who are waiting for a use of a cashier, a ticket machine, and the like. In that case, the object 22 is a person. Additionally, for example, the object queue 20 is a queue of vehicles waiting for a use of a parking lot. In that case, the object 22 is a vehicle. In FIG. 1, the object 22 is a person.

The information processing apparatus 2000 generates element information which is information on the objects 22 included in the object queue 20 by using the video frame 14 from which the object queue 20 is detected. The element information is information in which an area in the video frame 14 occupied by the object 22 (hereinafter referred to as object area 24) is associated with an attribute of the object 22, for each object 22 included in the object queue 20.

For example, in FIG. 1, the object areas 24 of the objects 22-1 to 22-4 are respectively the object areas 24-1 to 24-4. The element information associates the attributes of the objects 22-1 to 22-4 with the object areas 24-1 to 24-4. According to the element information, the object queue 20 included in one video frame 14 can be described by dividing the object queue 20 by object areas 24 each of which is occupied by the object 22 forming the object queue 20.

Furthermore, the information processing apparatus 2000 detects a change in the object queue 20 based on the element information generated from the video frame 14 and the detection result of the object 22 to each video frame 14 generated after the video frame 14. Then, the information processing apparatus 2000 generates the element information for the object queue 20 after change to update the element information used by a change detection unit 2060. A specific method for the information processing apparatus 2000 to detect a change in the object queue 20 will be described later.

FIG. 2 is a diagram illustrating a process in time series in which the information processing apparatus 2000 detects a change in the object queue 20. In the example of FIG. 2, at a time point Tb, a change in the object queue 20 occurs such as "a head object 22 leaves the object queue 20".

The information processing apparatus 2000 detects the object queue 20 from the video frame 14-1 generated at a time point Ta. Then, the information processing apparatus 2000 generates the element information using the video frame 14-1. The generated element information is the same element information as that shown in FIG. 1.

At the subsequent time point Tb, the head object 22 (the object 22 having an identifier of p001) leaves the object queue 20. The information processing apparatus 2000 detects a change in the object queue 20 such as "the head object 22 leaves" based on the element information generated at the time point Ta and the detection result of the object 22 to the video frame 14 generated at the time point Ta or later. The information processing apparatus 2000 updates the element information used for detecting a change in the object queue 20 by generating the element information for the object queue 20 after change.

Thereafter, the information processing apparatus 2000 repeats a process of "detecting a change in the object queue 20 using the element information recently generated, and updating the element information".

According to the information processing apparatus 2000 of the present example embodiment, for the object queue 20 detected from the video data 12, the element information indicating the area (object area 24) occupied by each object 22 forming the object queue 20 and the attribute of the object 22 is generated. Therefore, the configuration of the object queue 20 in the video data 12 can be accurately recognized.

Further, the information processing apparatus 2000 detects a change in the object queue 20 based on the detection result of the object 22 to subsequent video frame 14 after the video frame 14 in which the element information is generated and the element information. Accordingly, a change in the object queue 20 are detected on the basis of a precise structure of the object queue indicated by the element information, thereby accurately recognizing a change in the object queue 20.

Hereinafter, the information processing apparatus 2000 of the example embodiment will be described in further detail.

<Example of Functional Configuration of Information Processing Apparatus 2000>

Figure 3:
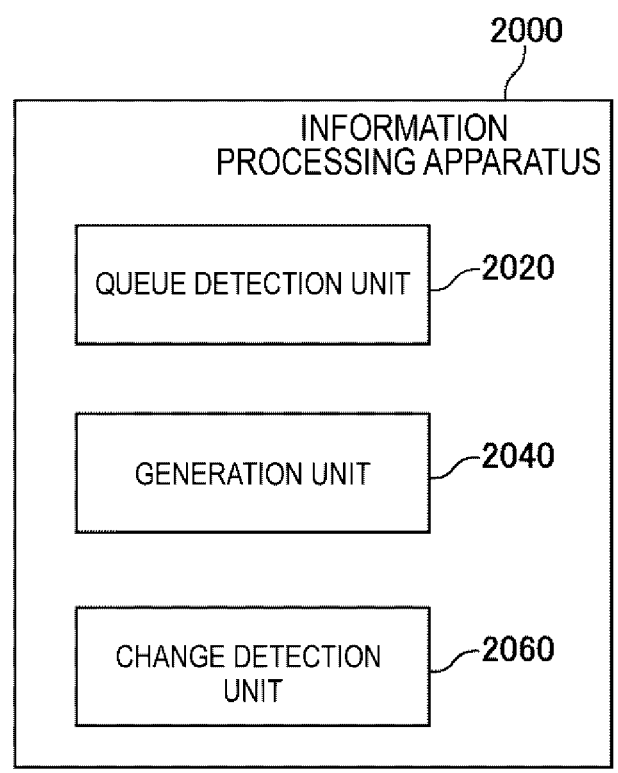
FIG. 3 is a diagram illustrating a configuration of the information processing apparatus according to the first example embodiment.

FIG. 3 is a diagram illustrating the configuration of the information processing apparatus 2000 according to the first example embodiment. The information processing apparatus 2000 includes a queue detection unit 2020, a generation unit 2040, and a change detection unit 2060. The queue detection unit 2020 detects the object queue 20 from the video data 12. The generation unit 2040 generates element information for each of a plurality of video frames 14 in which the object queue 20 is included. The change detection unit 2060 detects a change in the object queue by comparing the element information generated for each of the plurality of video frames 14.

<Example of Hardware Configuration of Information Processing Apparatus 2000>

Respective functional configuration units of the information processing apparatus 2000 may be realized by hardware (for example, a hard-wired electronic circuit or the like) which realizes the respective functional configuration units, or may be realized through a combination (for example, a combination of an electronic circuit and a program controlling the electronic circuit, or the like) of hardware and software. Hereinafter, a case where the respective functional configuration units of the information processing apparatus 2000 are realized through the combination of the hardware and the software will be further described.

Figure 4:
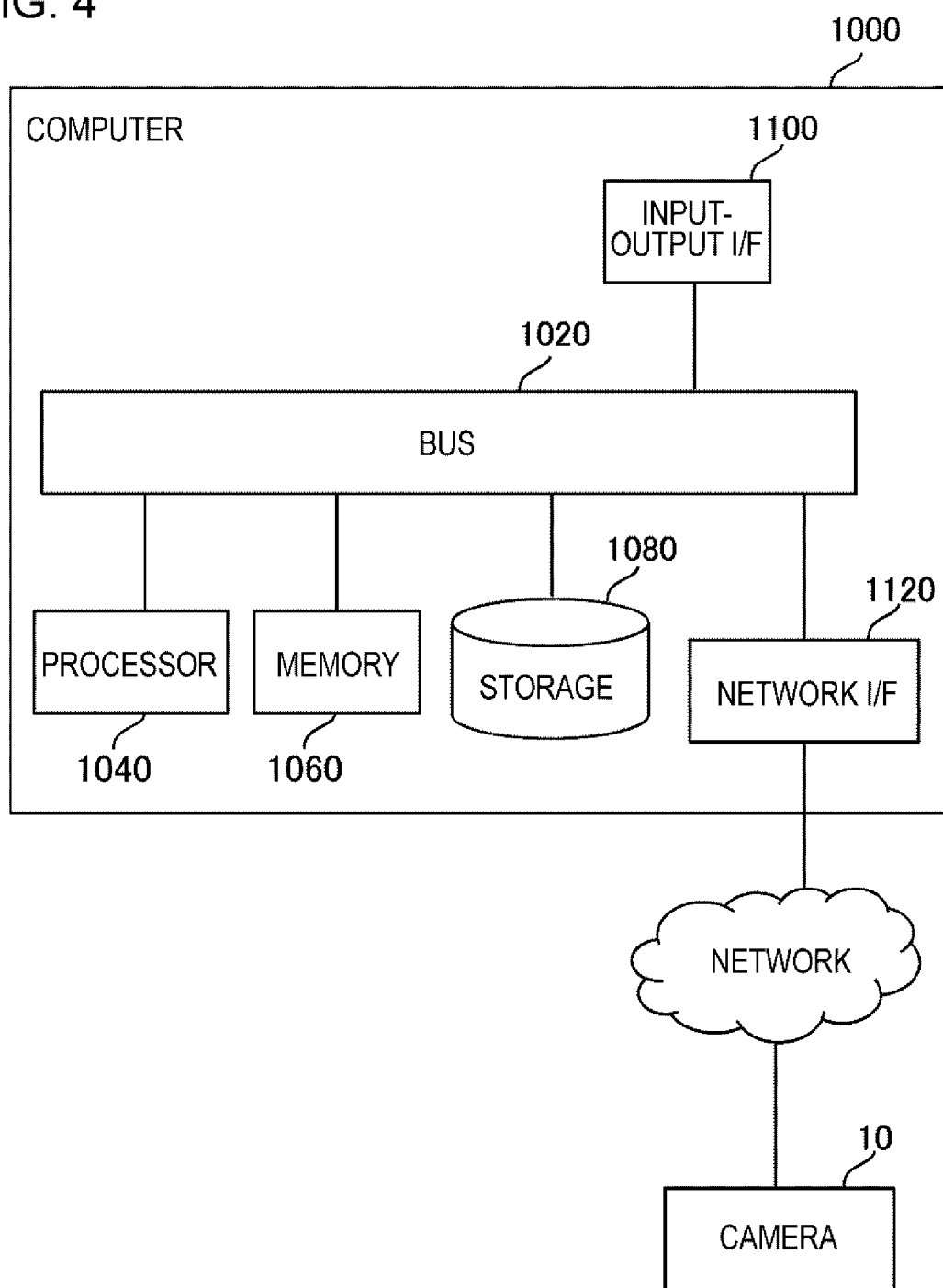
FIG. 4 is a diagram illustrating a computer which is used to realize the information processing apparatus.

FIG. 4 is a diagram illustrating a computer 1000 which is used to realize the information processing apparatus 2000. The computer 1000 is an arbitrary computer. For example, the computer 1000 includes a Personal Computer (PC), a server machine, a tablet terminal, a smartphone, or the like. The computer 1000 may be a dedicated computer, which is designed to realize the information processing apparatus 2000, or a general-purpose computer.

The computer 1000 includes a bus 1020, a processor 1040, a memory 1060, a storage device 1080, an input-output interface 1100, and a network interface 1120. The bus 1020 is a data transmission queue which is used for the processor 1040, the memory 1060, the storage device 1080, the input-output interface 1100, and the network interface 1120 to transmit and receive data to and from each other. However, a method for connecting the processor 1040 and the like to each other is not limited to bus connection. The processor 1040 is an arithmetic unit such as a Central Processing Unit (CPU) or a Graphics Processing Unit (GPU). The memory 1060 is a main memory device which is realized using a Random Access Memory (RAM) or the like. The storage device 1080 is an auxiliary storage device which is realized using a hard disk, a Solid State Drive (SSD), a memory card, a Read Only Memory (ROM), or the like. However, the storage device 1080 may include hardware which is the same as hardware, such as the RAM, included in the main memory device.

The input-output interface 1100 is an interface which is used to connect the computer 1000 to an input-output device. The network interface 1120 is an interface which is used to connect the computer 1000 to a communication network. The communication network is, for example, a Local Area Network (LAN) or a Wide Area Network (WAN). A method for connecting to the communication network via the network interface 1120 may be wireless connection or wired connection.

For example, the computer 1000 is communicably connected to the camera 10 through the network. However, a method for communicably connecting the computer 1000 to the camera is not limited to connection through the network. In addition, the computer 1000 may not be communicably connected to the camera 10.

The storage device 1080 stores program modules which are used to realize the respective functional configuration units (the queue detection unit 2020, the generation unit 2040, and the change detection unit 2060) of the information processing apparatus 2000. The processor 1040 realizes functions corresponding to the respective program modules by reading and executing the respective program modules in the memory 1060.

The computer 1000 may be realized using a plurality of computers. For example, the queue detection unit 2020, the generation unit 2040, and the change detection unit 2060 can be realized by different computers. In this case, the program modules stored in the storage device of each computer may be only the program modules corresponding to the functional configuration units realized by the computer.

<Camera 10>

The camera 10 is an arbitrary camera that can generate video data by repeatedly imaging. For example, the camera 10 is a surveillance camera provided to monitor a specific facility or a road.

Apart or all of the functions of the information processing apparatus 2000 may be realized by the camera 10. That is, the camera 10 may be used as the computer 1000 for realizing the information processing apparatus 2000. In this case, the camera 10 processes the video data 12 generated by itself. It is possible to use, for example, a camera called intelligent camera, network camera, or Internet Protocol (IP) camera as the camera 10 which realizes the information processing apparatus 2000.

<Flow of Process>

Figure 5:
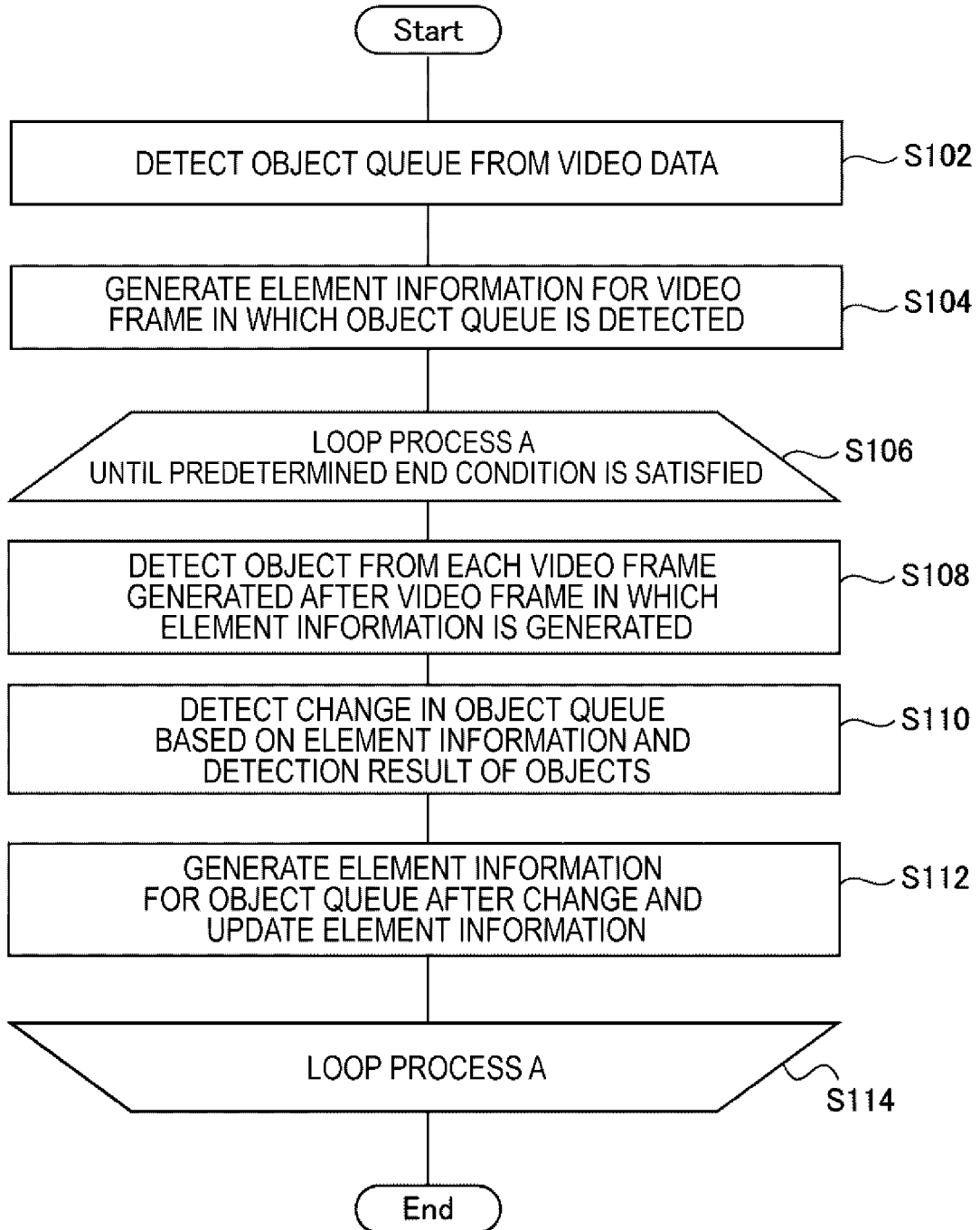
FIG. 5 is a flowchart illustrating a flow of process executed by the information processing apparatus according to the first example embodiment.

FIG. 5 is a flowchart illustrating a flow of process executed by the information processing apparatus 2000 according to the first example embodiment. The queue detection unit 2020 detects the object queue 20 from the video frame 14 included in the video data 12 (S102). The generation unit 2040 generates the element information for the video frame 14 in which the object queue 20 is detected (S104).

Steps S106 to S114 forms a loop process A that is repeatedly executed until a predetermined end condition is satisfied. If the predetermined end condition is satisfied in S106, the information processing apparatus 2000 ends the process of FIG. 5. On the other hand, in a case where the predetermined end condition is not satisfied, the process of FIG. 5 proceeds to S108.

The change detection unit 2060 detects the object 22 from each video frame 14 generated after the video frame 14 in which the element information is generated (S108). The change detection unit 2060 detects a change in the object queue 20 based on the element information and the detection result of the object 22 in S108 (S110). The generation unit 2040 updates the element information used by a change detection unit 2060 by generating the element information for the object queue 20 after change (S112). Since S114 is the end of the loop process A, the process of FIG. 5 proceeds to S106.

Thereafter, the information processing apparatus 2000 repeats a process of "detecting a change in the object queue 20 using the element information recently generated (S108 and S110), and updating the element information (S112)".

The predetermined end condition is arbitrary. For example, the predetermined end condition is that the number of objects 22 included in the object queue 20 becomes zero, i.e. the object queue 20 disappears. In this case, the information processing apparatus 2000 executes the process of FIG. 5 again from the beginning on the video data 12 constituted by the video frame 14 which is not processed yet. In this way, detection of a newly formed object queue 20 and detection of a change in the object queue 20 are performed.

<Method of Acquiring Video Data 12>

The information processing apparatus 2000 acquires video data 12 to be processed. There are various methods for acquiring the video data 12 by the information processing apparatus 2000. For example, the information processing apparatus 2000 receives the video data 12 transmitted from the camera 10. In addition, for example, the information processing apparatus 2000 accesses the camera 10 and acquires the video data 12 stored in the camera 10.

Note that, the camera 10 may store the video data 12 in a storage device provided outside the camera 10. In this case, the information processing apparatus 2000 accesses the storage device to acquire the video data 12. Therefore, in this case, the information processing apparatus 2000 and the camera 10 may not be communicably connected.

In a case where a part or all of the functions of the information processing apparatus 2000 is realized by the camera 10, the information processing apparatus 2000 acquires the video data 12 which are generated by the information processing apparatus 2000 itself. In this case, the video data 12 are stored in, for example, the storage device (the storage device 1080) inside the information processing apparatus 2000. Therefore, the information processing apparatus 2000 acquires the video data 12 from the storage devices.

The timing at which the information processing apparatus 2000 acquires the video data 12 is arbitrary. For example, every time a new video frame 14 constituting the video data 12 is generated by the camera 10, the information processing apparatus 2000 acquires one video data 12 by acquiring the newly generated video frame 14. In another example, the information processing apparatus 2000 may periodically acquire video frames 14 which are not acquired yet. For example, in a case where the information processing apparatus 2000 acquires the video frames 14 once the second, the information processing apparatus 2000 collectively acquires a plurality of video frames 14 (for example, in a case where a frame rate of the video data 12 is 30 frames/second (fps), 30 video frames 14) generated per second by the camera 10.

The information processing apparatus 2000 may acquire all the video frames 14 constituting the video data 12 or may acquire only a part of the video frames 14. In the latter case, for example, the information processing apparatus 2000 acquires the video frame 14 generated by the camera 10 at a ratio of one to a predetermined number.

<Detection of Object Queue 20: S102>

The queue detection unit 2020 detects the object queue 20 from the video data 12 (S102). Various methods can be adopted as a method of detecting the object queue 20 from the video data 12. An example thereof will be described below.

The queue detection unit 2020 detects an object from each video frame 14 and tracks each object 22. Here, it is determined in advance what to detect as the object 22. For example, in a case where a queue of people is regarded as the object queue 20, it is defined to detect a person as the object 22. In another example, in a case where a queue of vehicles is regarded as the object queue 20, it is defined to detect a vehicle as the object 22. A well-known technique can be used as a technique for detecting a specific type of object from a video frame (that is, image data).

The queue detection unit 2020 tracks the object 22 by, for example, the following method. However, the method for detecting the object 22 by the queue detection unit 2020 is not limited to the following method, and various known techniques may be used.

The queue detection unit 2020 tracks objects by assigning an identifier to each object detected from the video frame 14, and managing information related to the object (hereinafter, tracking information) for each identifier of the object. The tracking information on an object 22 includes, for example, coordinates representing a position of the object 22 in the video frame 14, a size, and a feature value computed from the image area (feature value of the object). The position of the object 22 is, for example, the center position of the image area representing the object 22 in the video frame 14. The feature value of the object 22 is a feature of an appearance of the object represented by one or more values.

When tracking the object, the queue detection unit 2020 determines whether the object is in a stationary state or a moving state. For example, in a case where a change amount of a position of an object is equal to or less than a predetermined amount and such a state continues over a predetermined time or more, the queue detection unit 2020 handles the state of the object to the stationary state. On the other hand, a state of the object whose change amount of the position is larger than a predetermined value is handled as the movement state. Also, the state of the object is indicated by the tracking information described above. A well-known technique can also be used as a technique for determining whether the object being tracked is in the stationary state or not.

Figure 6:
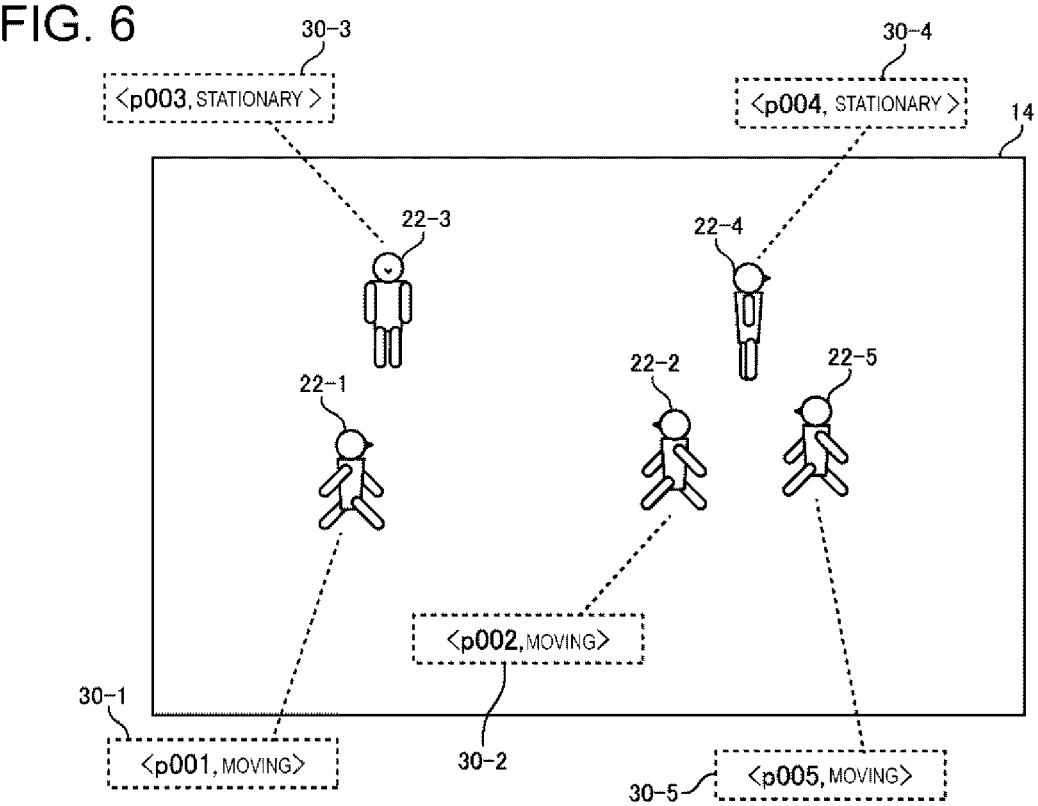
FIG. 6 is a diagram illustrating an object detected from video data being tracked.

FIG. 6 is a diagram illustrating the object 22 detected from video data 12 being tracked. The video frame 14 includes five objects 22 (object 22-1 to object 22-5). Identifiers p001 to p005 are assigned to these five objects 22, respectively. Then, tracking information 30 is generated for these five objects 22. In FIG. 5, for convenience of illustration, the tracking information 30 shows only the identifier and the state of the object 22.

The queue detection unit 2020 detects the object 22 from each of the time-series video frames 14 constituting the video data 12. The queue detection unit 2020 associates the object 22 detected from the newly analyzed video frame 14 with the object 22 detected from the already analyzed video frame 14 (tracking information has already been generated). In other words, the queue detection unit 2020 determines whether the object 22 detected from the newly analyzed video frame 14 is the known object 22 or an unknown object.

In a case where the object 22 detected from the newly analyzed video frame 14 is the known object 22, the queue detection unit 2020 updates the tracking information on the object 22 with the information on the object 22 acquired from the newly analyzed video frame 14. For example, the queue detection unit 2020 updates information such as the position, the feature value, or the state of the object 22. On the other hand, in a case where the object 22 detected from the newly analyzed video frame 14 is an unknown object 22, the queue detection unit 2020 assigns an identifier to the object 22 that is not the same as that of the other objects 22. Then the queue detection unit 2020 generates tracking information on the object 22.

Here, there is a case where the object 22 being tracked is temporarily not detected from the video frame 14 due to the influence of ambient light or the like. In such a case, if the tracking information on the object 22 is updated or deleted by handling as that the object 22 is out of an imaging range of the camera 10, the tracking of the object 22 cannot be accurately performed.

Therefore, in a case where the object 22 is temporarily not detected from the video frame 14 as described above, the queue detection unit 2020 does not delete the tracking information on the object 22. For example, even in a case where the object 22 is not detected, the queue detection unit 2020 holds the tracking information on the object 22 without updating the tracking information as long as a length of the period in which the object 22 is not detected is equal to or shorter than a predetermined value. Thereafter, in a case where the object 22 is detected from the video frame 14, the tracking information on the object 22 is updated with the information detected from the video frame 14. On the other hand, in a case where the length of the period in which the object 22 is not detected is longer than the predetermined value, the queue detection unit 2020 deletes tracking information on the object 22 or adding information indicating that the object 22 is out of the imaging range of the camera 10 to the tracking information on the object 22 to update the tracking information. By doing this, even in a case where the object 22 is temporarily not able to be detected from the video frame 14, the object 22 can be tracked with high accuracy.

Furthermore, in a case where the object 22 is temporarily not detect from the video frame 14, another object 22 may be detected instead. As an example, there is a case where an object 22-1 is detected at a position P in a video frame 14-1, then the object 22-1 is not detected in the next video frame 14-2, and another object 22-2 is detected near the position P. In such a case, in a case where the object 22-2 is mistakenly regarded as the object 22-1 and the tracking information on the object 22-1 is updated, the object 22-1 and the object 22-2 cannot be properly tracked.

Therefore, for example, even in a case where the objects 22 having high similarity of feature values are detected in two successive video frames 14 in time series, if a distance between the detection positions thereof is longer than the predetermined distance, the queue detection unit 2020 regards the objects 22 as a different object 22, and does not update the tracking information on the object 22 detected from the previous video frame 14. Furthermore, even in a case where the objects 22 whose positions are close to each other are detected in two successive video frames 14 in time series, if the similarity of feature values of the objects 22 is low, the queue detection unit 2020 regards the objects 22 as a different object 22, and does not update the tracking information on the object 22 detected from the previous video frame 14.

By doing this, in the case where an object 22 is temporarily not detected from the video frame 14 and another object 22 is detected near the position of the object 22, it is possible to prevent the tracking information from being erroneously updated. Thus, tracking of the object 22 can be performed with high accuracy.

The queue detection unit 2020 detects that a new object queue 20 is formed by detecting that the objects 22 being tracked satisfy a predetermined condition. For example, the queue detection unit 2020 determines that the new object queue 20 is formed in a case where a plurality of objects 22 among the objects 22 being tracked satisfy the following three conditions. The conditions include 1) not to belong to the already detected object queue 20, 2) to be positioned at a place whose distance from another adjacent object 22 is equal to or less than the predetermined distance, and 3) to be in the stationary state.

Here, whether an object belongs to the already detected object queue 20 can be determined from the process of tracking the object. For example, the tracking information 30 described above includes information indicating whether the object 22 belongs to the object queue 20. Here, "do not belong to the object queue 20 (not belong)" is set as an initial value of the information. Then, in a case where it is detected that the object 22 being tracked satisfies the above-mentioned conditions and the new object queue 20 is formed, the tracking information on the object 22 indicates that the object 22 "belongs to the object queue 20 (belong)". In this way, it can be determined whether each object 22 belongs to the object queue 20 in advance.

In addition to the above three conditions, the orientation of the object 22 may be further considered. Specifically, the condition that "each object 22 satisfying the conditions 1) to 3) faces the same direction" is further added. In another example, a condition that "among the plurality of objects 22 who satisfy the conditions 1) to 3), more than a predetermined ratio of those objects 22 faces the same direction".

Figure 7:
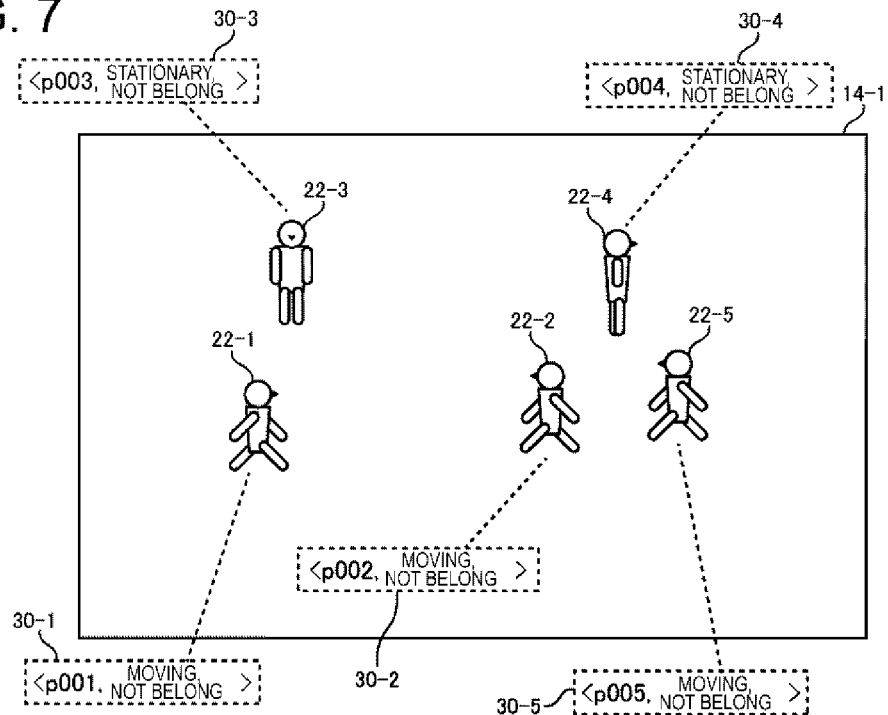
FIG. 7 is a diagram illustrating a method of detecting a new object queue.
Figure 7:
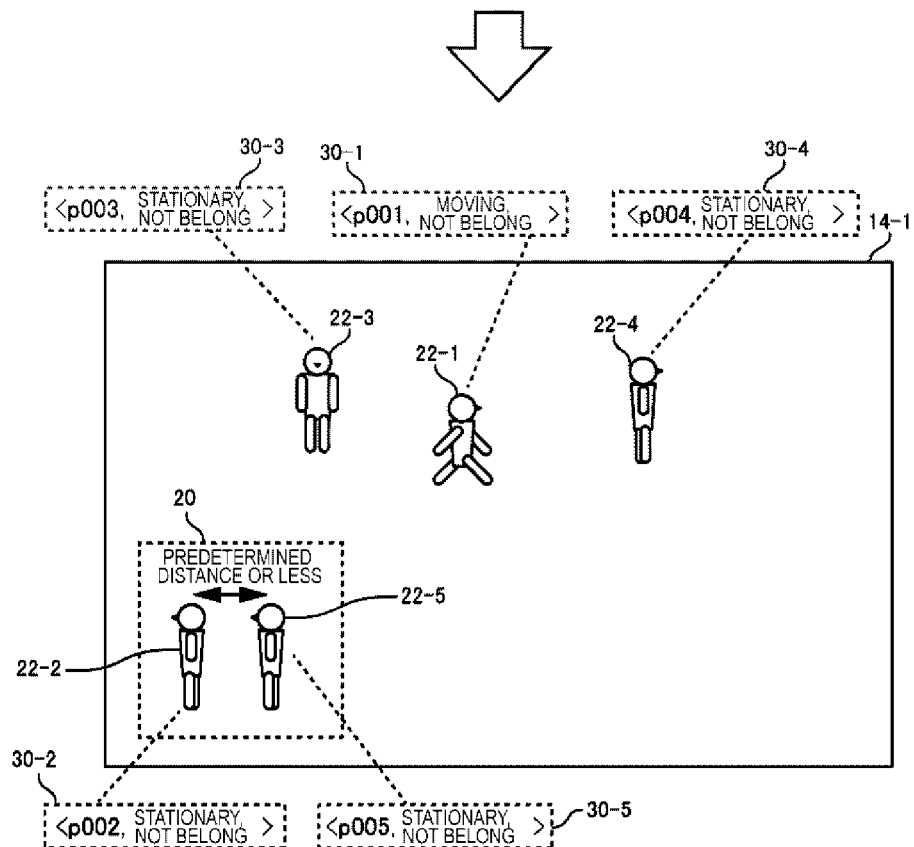

FIG. 7 is the first diagram illustrating a method of detecting the new object queue 20. In the video frame 14-1, none of the objects 22-1 to 22-5 belongs to the existing object queue 20. However, the object 22-1, 22-2, and 22-5 are moving. Therefore, these objects 22 do not satisfy the conditions for forming the object queue 20. In addition, although the objects 22-3 and 22-4 are stationary, the distance between each other is larger than a predetermined distance. Therefore, these objects 22-3 and 22-4 do not satisfy the conditions for forming the object queue 20. Therefore, the object queue 20 is not detected from the video frame 14-1.

It is assumed that the video frame 14-2 is generated a little later the video frame 14-1 is generated. In the video frame 14-2, none of the objects 22-1 to 22-5 belong to the existing object queue 20. The objects 22-1 and 22-5 are stationary. Furthermore, the distance between the objects 22-2 and 22-5 is equal to or less than a predetermined distance. Thus, the queue detection unit 2020 detects that the new object queue 20 is formed by the objects 22-2 and 22-5. The other objects 22 do not satisfy the conditions for forming the object queue 20.

According to the method for detecting the new object queue 20 in a case where the above three or four conditions are satisfied, it is possible to detect the formation of the object queue 20 even in a case where a place where the object queue 20 is formed is unknown. In this regard, there is a case where it is possible to predetermine a place where the object queue 20 is formed. For example, in a checkout in a supermarket, a place where a queue of people for a checkout forms is approximately known.

Therefore, an area in which the object queue 20 can be formed (hereinafter, "preset area") may be defined in advance, and the object queue 20 may be detected using the definition. That is, the queue detection unit 2020 detects that the new object queue 20 is formed by one or more objects in a case where the one or more objects 22 being tracked are in the stationary state in the preset area. According to the method, even in a case where the number of objects forming the object queue 20 is one, the object queue 20 can be detected.

Figure 8:
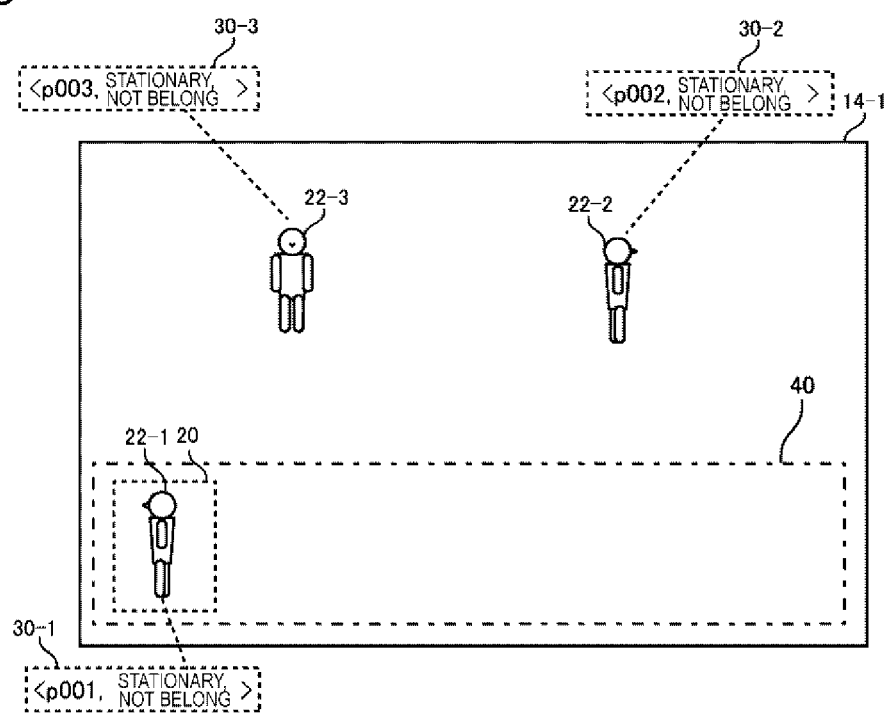
FIG. 8 is a diagram illustrating a method of detecting an object queue using a preset area.

FIG. 8 is a diagram illustrating a method of detecting an object queue 20 using a preset area. In FIG. 8, the object 22-1 is stationary in the preset area 40. Therefore, the queue detection unit 2020 detects the object queue 20 formed by the object 22-1.

The method of detecting the object queue 20 from the video data 12 by the queue detection unit 2020 is not limited to the method described above. The queue detection unit 2020 may detect the object queue 20 by using an existing technique for detecting a queue of objects from video data.

<Generation of Element Information: S104>

The generation unit 2040 generates summary information on the object queue 20 using the video frame 14 in which the object queue 20 is detected by the queue detection unit 2020 (S104). As described above, the element information is information that associates the object area 24 which is an area occupied by the object 22 in the video frame 14 with the attribute of the object 22. Therefore, in order to generate element information, it is necessary to determine the attribute and the object area 24 for each object 22. Each identification method thereof will be described below.

<<Determining Attribute of Object 22>>

The attribute of the object 22 may include various information. For example, the attribute of the object 22 includes the feature value of the object 22. When the object 22 is a person, the feature value of the object 22 represents, for example, a face, a body, clothes, or a color of belongings, and the like. When the object 22 is a vehicle, the feature value of the object 22 represents the color, shape, or vehicle registration plate of the vehicle. Here, existing technique can be used as the technique for computing the feature value of the object included in the video frame.

In another example, the attribute of the object 22 indicates a position of the object 22 in the object queue 20. Here, in order to determine the position of the object 22 in the object queue 20, the information processing apparatus 2000 determines a head and the tail in the object queue 20. Hereinafter, a method of determining the head and the tail in the object queue 20 will be described.

<<<Determination of Head Object of Object Queue 20>>>

For example, the generation unit 2040 determines an advancing direction of the object queue 20, and determines the object 22 which is positioned at the end of the advancing direction in the object queue 20 as the head object 22. Here, the advancing direction of the object queue can be determined, for example, as the front direction of each object 22 forming the object queue 20. The existing technique can be used for the technique of determining the front direction of the object 22. For example, in a case where the object 22 is a person, applicable methods of determining the front direction of the object 22 include: 1) determining the front direction of the face by performing head detection, and handling the front direction of the face as the front direction of the object 22; or 2) determining the front direction of the body by performing body detection, and handling the front direction of the body as the front direction of the object 22. In a case where the object 22 is a vehicle, the advancing direction of the vehicle can be determined based on the shape of the vehicle.

Note that, the generation unit 2040 may determine the advancing direction of the object queue 20 more accurately by analyzing a movement of the object queue 20 using the video data 12 after generating the element information. Specifically, the generation unit 2040 determines the advancing direction of the object queue 20 by comparing the plurality of video frames 14 including the object queue 20 with one another to determine the direction in which the objects 22 forming the object queue 20 move. In a case where the movement direction of the object queue 20 determined in this manner is different from the movement direction determined when generating the element information, the generation unit 2040 changes the attribute of the object 22 based on the newly determined movement direction of the object queue 20.

<<<Determination of Tail of Object Queue 20>>>

For example, the generation unit 2040 determines an advancing direction of the object queue 20, and determines the object 22 which is positioned at an opposite end in the advancing direction in the object queue 20 as the tail object. The method of determining the advancing direction of the object queue 20 is as described above.

<<Determining Object Area 24>>

The generation unit 2040 divides the image area representing the entire object queue 20 at a boundary between two objects 22 adjacent to each other. By doing this, the generation unit 2040 divides the image area of the object queue 20 into a plurality of partial areas occupied by each object 22. The object area 24 of the object 22 is a partial area including the object 22 among partial areas obtained by dividing the object queue 20 by the above-described method. Note that, the existing technique for determining the image area which represents the whole object queue 20 can be used.

In order to determine the object area 24, the generation unit 2040 determines the boundary between the objects 22 adjacent to each other in the object queue 20. The boundary between two objects 22 adjacent to each other can be determined, for example, by the following method.

Figure 9:
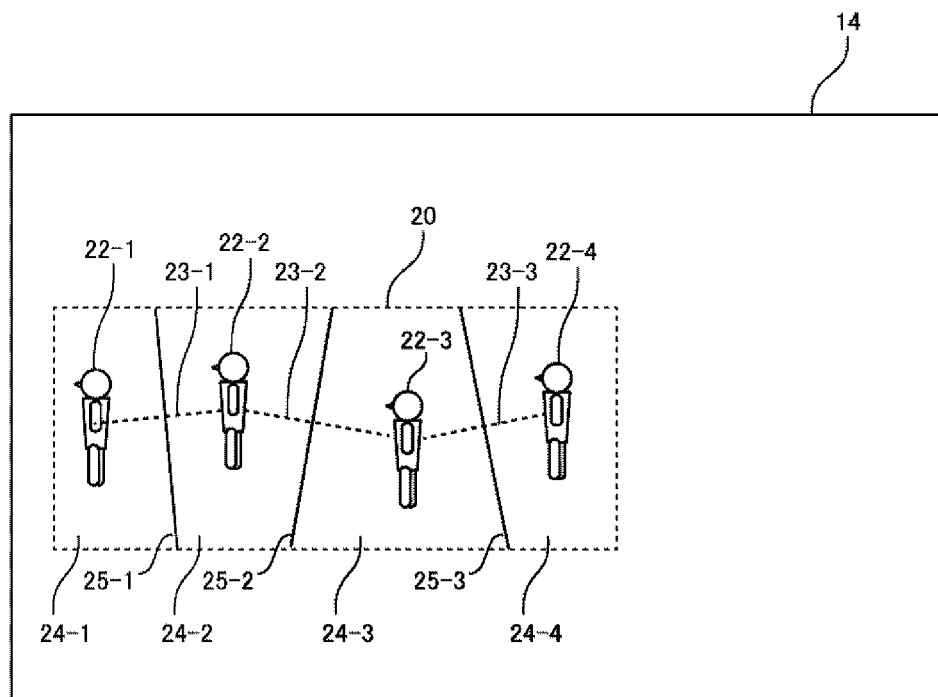
FIG. 9 is a diagram illustrating a method of determining an object area.

FIG. 9 is a diagram illustrating a method of determining the object area 24. The generation unit 2040 computes the center of a line segment 23 connecting the positions of two objects 22 adjacent to each other. The generation unit 2040 sets a normal line of the line segment passing through the computed center as a boundary line 25 between the two objects 22. The generation unit 2040 determines the object area 24 of the object 22 as the area between the boundary lines 25 at the front and rear of the object 22. The position of the object 22 is, as described above, the center position of an image area representing the object 22.

Here, the method of determining a length of the boundary line 25 is arbitrary. For example, the generation unit 2040 sets the length of the boundary line 25 to a predetermined length which is preset.

<Detection of Change in Object Queue 20: S108, S110>

Furthermore, the change detection unit 2060 detects a change in the object queue 20 based on the element information generated from the video frame 14 and the detection result of the object 22 with respect to video frames 14 generated after that video frame 14 (S108, S110). The object 22 for each video frame 14 is detected, for example, by tracking the object 22 described above. That is, the change detection unit 2060 tracks each object 22 in the video data 12 constituted by the video frame 14 after the video frame 14 for which element information is generated, and detects a change in the object queue 20 based on the movement or state of the object 22 recognized by the tracking and the element information.

Here, the change of the object queue 20 detected by the change detection unit 2060 is various. Hereinafter, the change of the object queue 20 detected by the change detection unit 2060 will be illustrated.

<<Leave of Object 22>>

The change detection unit 2060 detects that the object 22 left the object queue 20. The leave of the object 22 means that the object 22 becomes not belonging to the object queue 20. A case where the object 22 temporarily leaves the object queue 20 and then returns to the same position at the object queue 20 is not described as the leave. Therefore, in a case where an object 22 is not detected from the object queue 20, the change detection unit 2060 distinguishes between a case where the object 22 temporarily leaves the object queue 20 and a case where the object 22 does not return to the object queue 20 (leaves the object queue 20).

The leave of the object 22 is roughly classified into following three cases: 1) a case where the head object 22 leaves, 2) a case where the tail object 22 leaves, and 3) a case where the object 22 which is neither the head object nor the tail object leaves. Detection method will be described for each of the cases. In the following, a position that is neither at a head nor a tail in the object queue 20 is expressed as the "middle portion".

<<<Case Where Head Object 22 Leaves>>>

Figure 10:
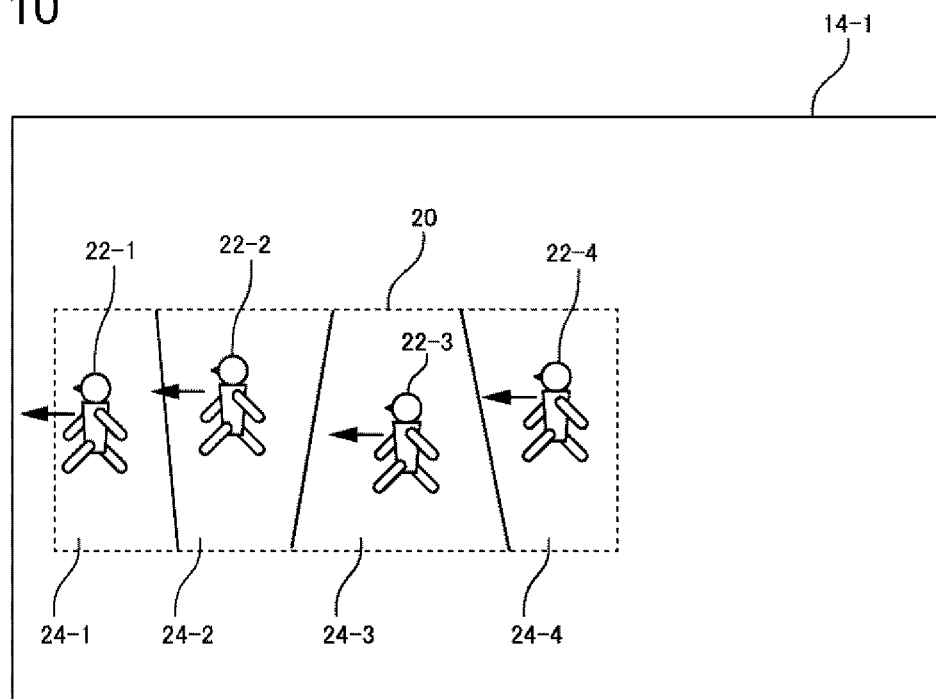
FIG. 10 is a diagram illustrating a case where a head object leaves an object queue.
Figure 10:
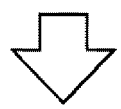
Figure 10:
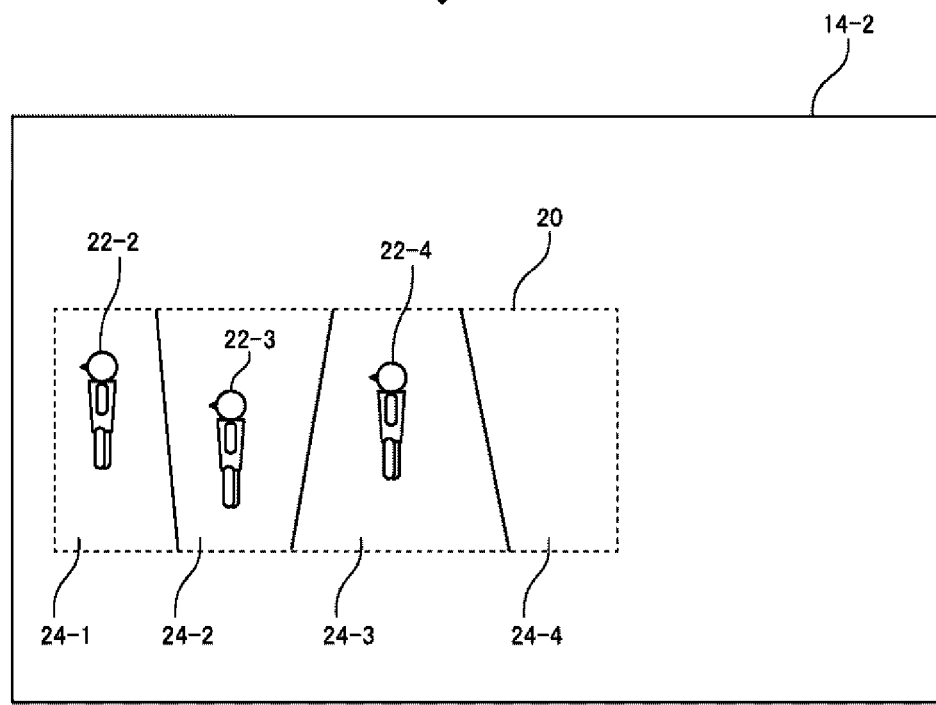

FIG. 10 is a diagram illustrating a case where the head object 22 leaves the object queue 20. In FIG. 10, the object 22-1 which is positioned at the head leaves the object queue 20.

First, in a case where the head object 22 leaves, the object 22 is not detected from the object area 24 of the object 22. For example, in FIG. 10, the object 22-1 is not detected from the object area 24-1.

Further, the object 22 which is positioned at the second from the head enters the object area 24 of the head object 22. For example, in FIG. 10, the object 22-2 enters the object area 24-1.

Therefore, the change detection unit 2060 detects that the head object 22 left in a case where following two conditions are satisfied: 1) the object 22 is not detected from the object area 24 of the head object 22; and 2) the object 22 which is positioned at the second from the head enters the object area 24 of the head object 22.

<<<Case Where Tail Object 22 Leaves>>>

Figure 11:
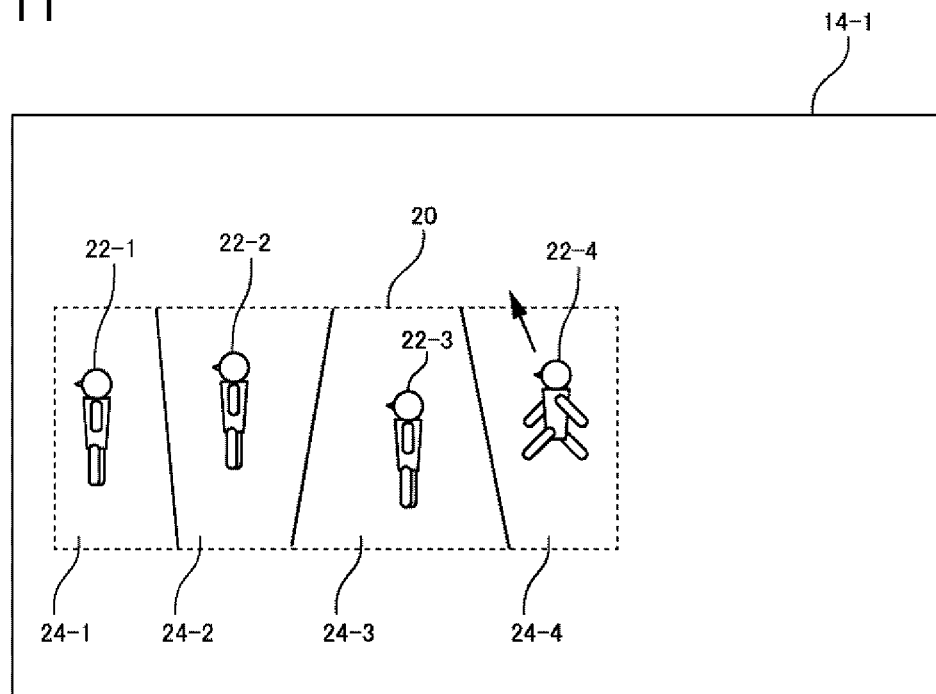
FIG. 11 is a diagram illustrating a case where a tail object leaves an object queue.
Figure 11:
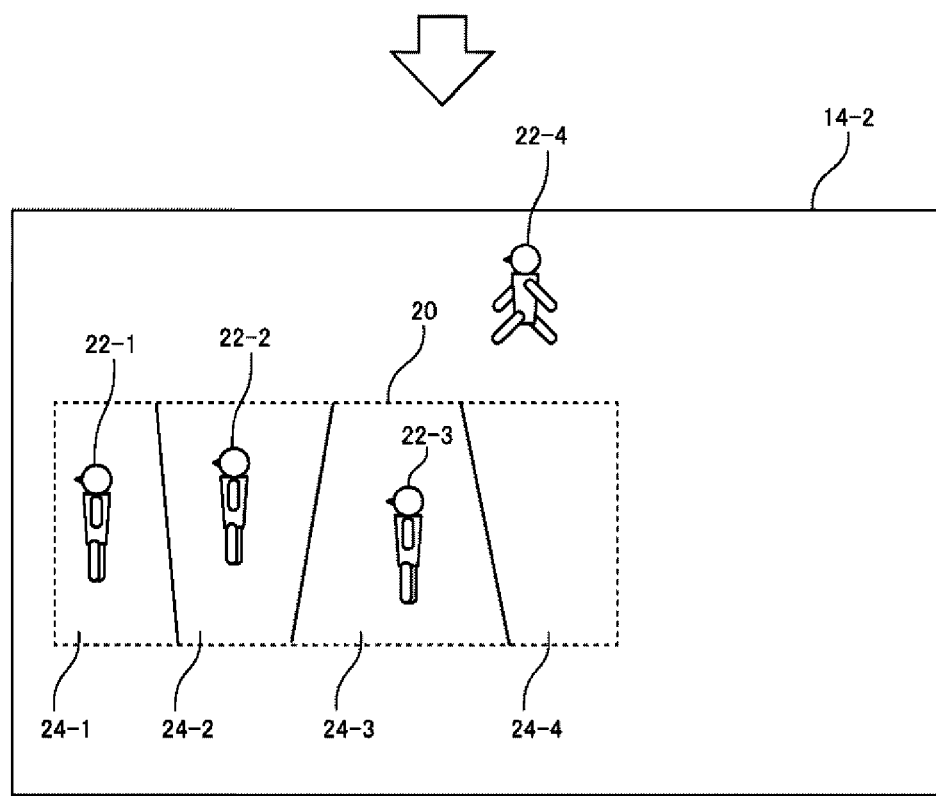

FIG. 11 is a diagram illustrating a case where the tail object 22 leaves the object queue 20. In FIG. 11, the object 22-4 which is positioned at the tail leaves the object queue 20.

First, in a case where the tail object 22 leaves, the object 22 is not detected from the object area 24 of the object 22. For example, in FIG. 11, the object 22-4 is not detected from the object area 24-4.

Furthermore, the object 22 which is positioned at the second from the tail is in the stationary state. For example, in FIG. 11, the object 22-3 is in the stationary state.

Therefore, the change detection unit 2060 detects that the tail object 22 left the object queue 20 in a case where following two conditions are satisfied: 1) the object 22 is not detected from the object area 24 of the tail object 22; and 2) the object 22 which is positioned at the second from the tail is in the stationary state.

In another example, the change detection unit 2060 detects that the tail object 22 left the object queue 20 in a case where following two conditions are satisfied: 1) a distance between the tail object 22 and the object 22 which is positioned right before the tail object 22 is equal to or more than a predetermined distance; and 2) the object 22 which is positioned at the second from the tail is in the stationary state.

<<<Case where Object 22 Neither Head Object Nor Tail Object Leaves>>>

In a case where there are three or more objects 22 forming the object queue 20, there are objects 22 in the middle portion (objects 22 that are neither at the head nor at the tail). For example, in FIG. 5, objects 22 at the middle portion are the object 22-2 and the object 22-3.

Figure 12:
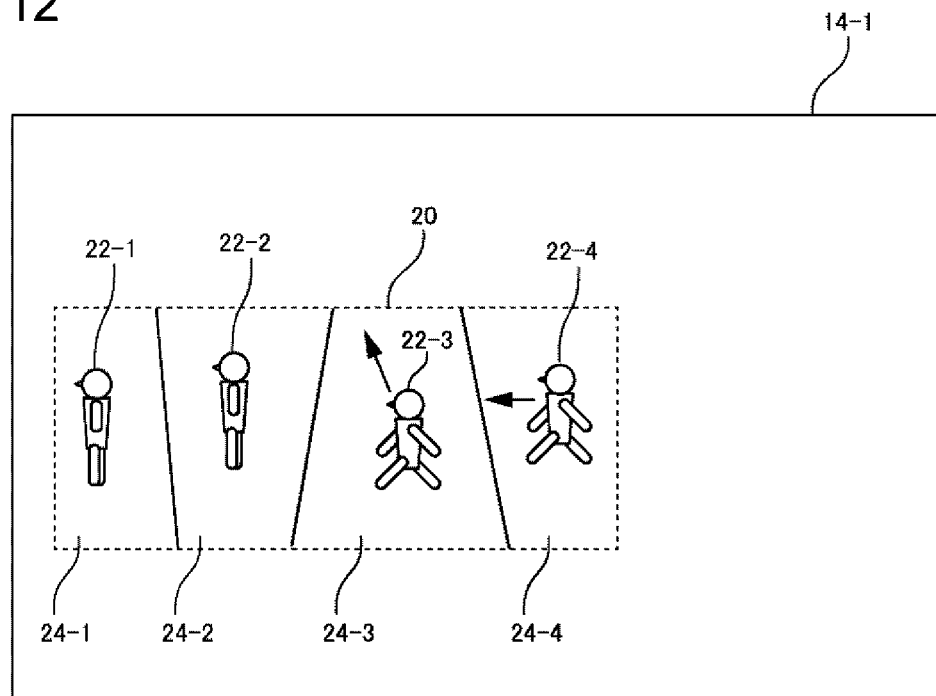
FIG. 12 is a diagram illustrating a case where an object area in a middle portion leaves.
Figure 12:
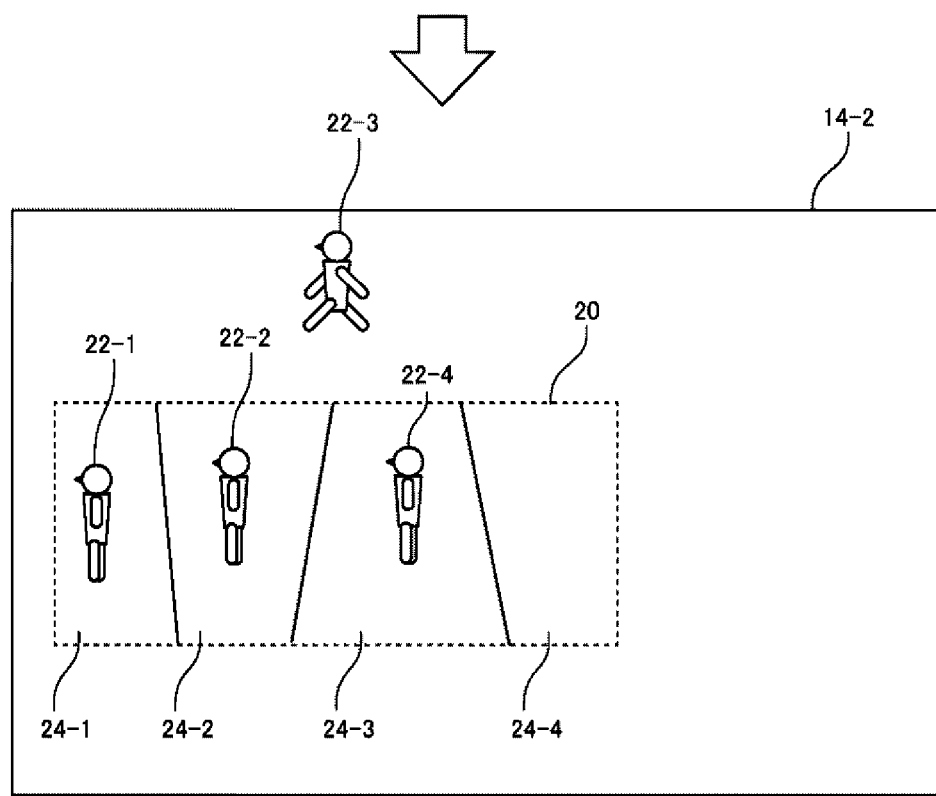

FIG. 12 is a diagram illustrating a case where the object area 24 in the middle portion leaves. In FIG. 12, the object 22-3 which is positioned in the middle portion leaves. First, the leaving object 22 is not detected from the object area 24 of the object 22. For example, in FIG. 12, the object 22-2 is not detected from the object area 24-3.

In addition, unlike a case where the object 22 in the middle portion temporarily leaves the object queue 20, in a case where the object 22 in the middle portion leaves the object queue 20, the object 22 which is positioned right behind the leaving object 22 enters the object area 24 of the leaving object 22. For example, in FIG. 12, an object 22-4 which is positioned right behind the objects 22-3 enters the object area 24-3.

Furthermore, unlike a case where the head object 22 leaves the object queue 20, in a case where the object 22 in the middle portion leaves the object queue 20, the object 22 which is positioned right before the leaving object 22 is in the stationary state. For example, in FIG. 12, the object 22-2 which is positioned right before the object 22-3 is in the stationary state.

Therefore, the change detection unit 2060 determines that the object 22 left the object area 24 in the middle portion in a case where following three conditions are satisfied: 1) an object 22 is not detected from the object area 24 corresponding to the object 22, and 2) an object 22 right behind the object 22 enters the object area 24 of the object 22, 3) an object 22 right before the object 22 is in the stationary state.

<<Join of Object 22>>

For example, the change detection unit 2060 detects that an object 22 joins the object queue 20. Here, in a case where an object 22 not belonging to the object queue 20 appears in the vicinity of the object queue 20 and becomes stationary, it seems that the object 22 has joined the object queue 20. However, in practice, the object 22 may only be stationary near the object queue and not join the object queue 20. Specifically, an object 22 that newly joins the object queue 20 is added to the tail of the object queue 20; thus, in a case where an object 22 is stationary at places other than the tail of the object queue 20 and is positioned near the object queue 20, it is assumed that the object 22 does not join the object queue 20.

Therefore, the change detection unit 2060 detects that an object 22 joins the object queue 20 in a case where following two conditions are satisfied: 1) the distance between the object 22 at the tail of the object queue 20 and an object 22 which is being tracked but does not belong to the object queue 20 is equal to or less than a predetermined distance; and 2) the object 22 is in a stationary state.

Figure 13:
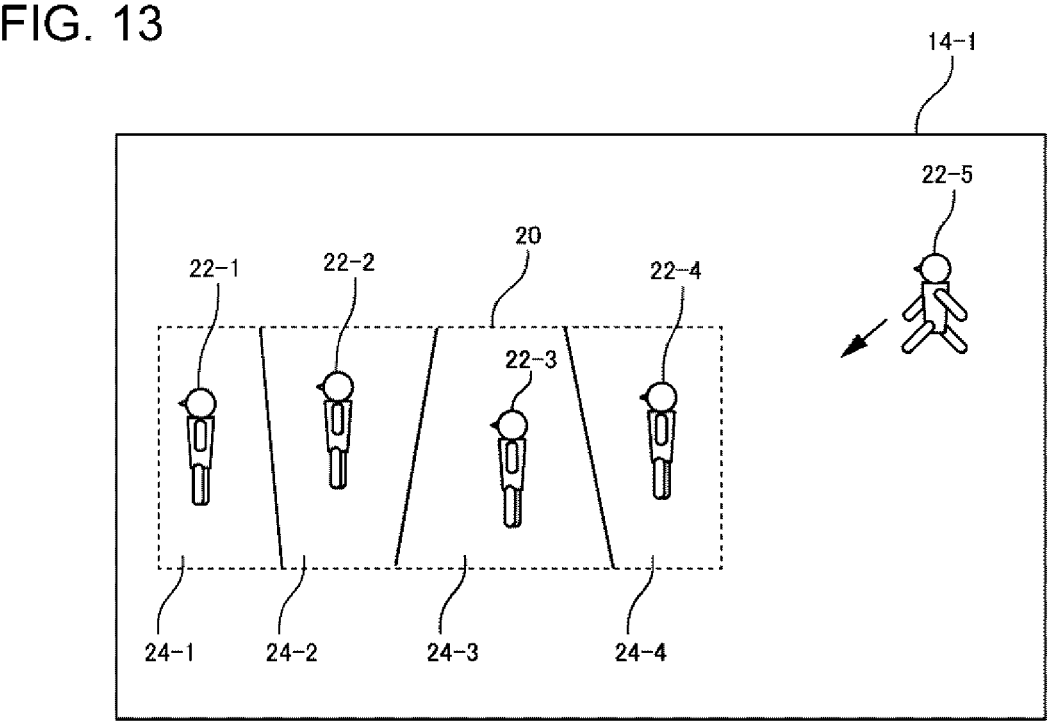
FIG. 13 is a diagram illustrating a case where an object joins an object queue.
Figure 13:
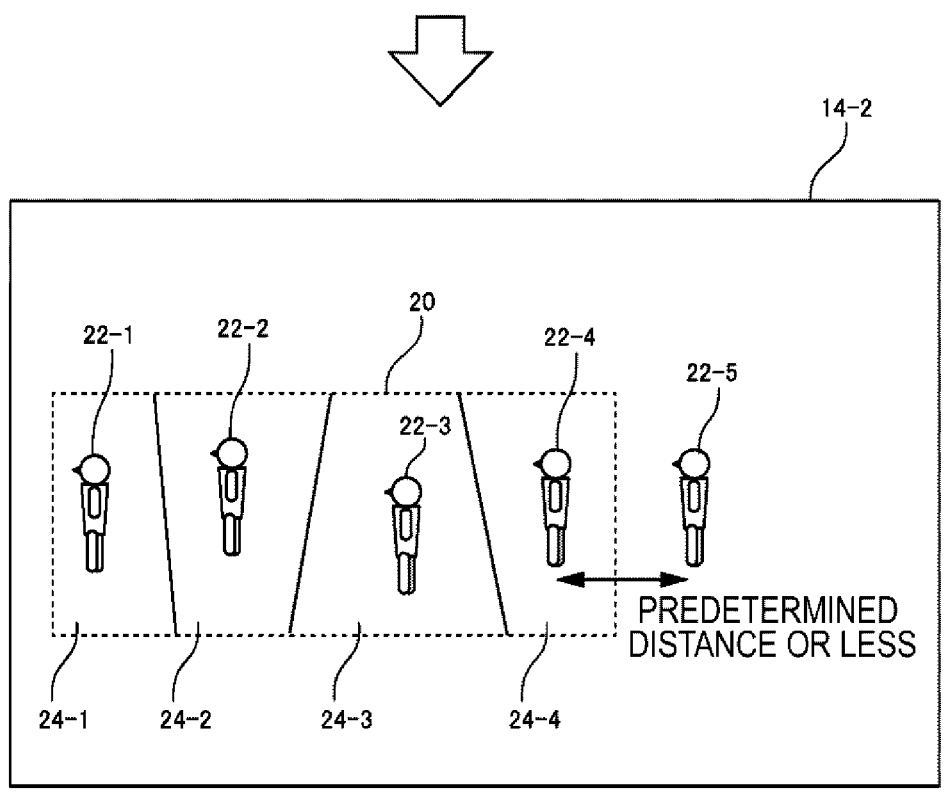

FIG. 13 is a diagram illustrating a case where an object 22 joins the object queue 20. In FIG. 13, the object 22-5 joins the object queue 20 formed by the objects 22-1 to 22-4. Here, the object 22-4 is stationary after moving to a place where the distance from the object 22-4 which is positioned at the tail of the object queue 20 is equal to or less than a predetermined distance. Thus, the change detection unit 2060 detects that the object 22-5 joins the object queue 20.

<Update of Element Information: S112>

When the change detection unit 2060 detects a change in the object queue 20, the generation unit 2040 updates element information to be used by the change detection unit 2060 (S112). For example, in the same manner as in S104, the generation unit 2040 generates element information for the video frames 14 in which all the objects 22 forming the object queue 20 are in the stationary state and which are generated after the video frame 14 in which a change in the object queue 20 is detected. Thereafter, the newly generated element information is used for the detection of the change in the object queue 20 by the change detection unit 2060. That is, the element information to be used by the change detection unit 2060 is updated.

Here, the reason for using the video frame 14 in which all the objects 22 are in the stationary state is that the state of the object queue 20 is changing in a case where the objects 22 are in the moving state (for example, in a case where the head object 22 left, other objects 22 moves forward one by one). By using the video frame 14 in which all the objects 22 are in the stationary state, element information is generated for the object queue 20 in the steady state (for example, an object queue 20 in which the head object 22 left and the other objects 22 completed moving forward one by one).

However, the generation unit 2040 may also generate element information for the object queue 20 whose structure is changing. That is, the generation unit 2040 may repeatedly updates element information by generating element information in the same manner as in S104 for each of a plurality of video frames 14 generated after the video frame 14 in which a change in the object queue 20 is detected. For example, the update is performed until all the objects 22 forming the object queue 20 are in the stationary state.

Modification Example

Figure 14:
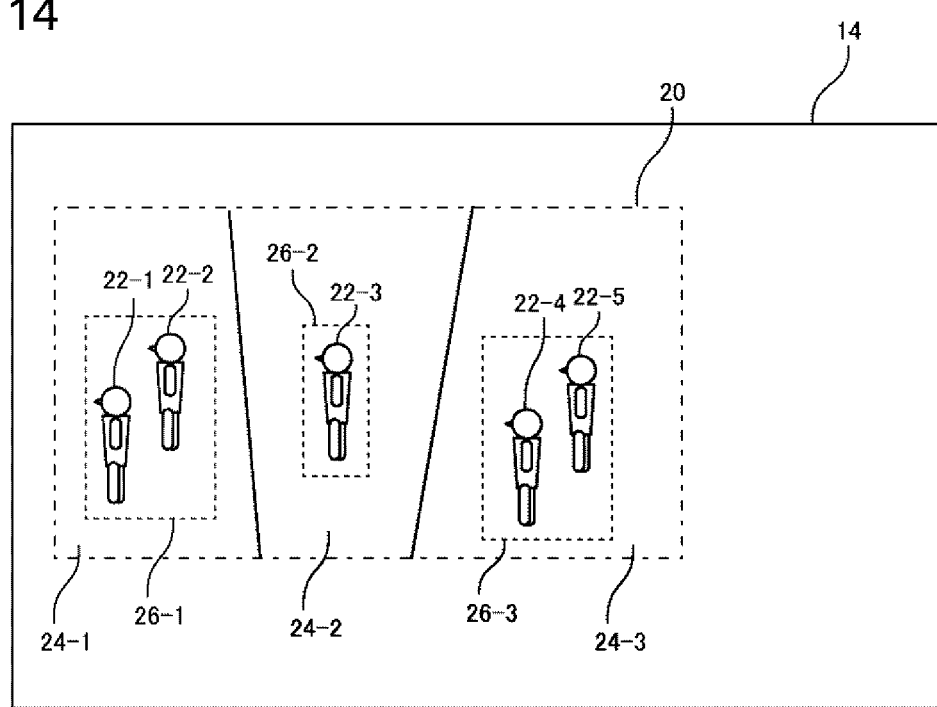
FIG. 14 is a diagram illustrating an object queue formed by object groups.

The information processing apparatus 2000 may use a group (hereinafter, object group) including a plurality of objects 22 as a unit forming the object queue 20. FIG. 14 is a diagram exemplifying an object queue 20 formed by object groups. In FIG. 14, the object queue 20 is formed by three object groups of an object group 26-1, an object group 26-2, and an object group 26-3. The object group 26-1 is formed by the object 22-1 and the object 22-2. The object group 26-2 is formed by the object 22-3. The object group 26-3 is formed by the object 22-4 and the object 22-5.

The object area 24 indicated by element information is an area indicated by the object group 26 in the video frame 14. Therefore, the generation unit 2040 determines the object area 24 for each object group. In FIG. 14, an object area 24-1 is an object area of an object group 26-1, an object area 24-2 is an object area of an object group 26-2, and an object area 24-3 is an object area of an object group 26-3.

Further, the attribute indicated by the element information is the attribute of the object group 26. Therefore, the generation unit 2040 determines, for each object group 26, the attribute of the object group 26. The attributes of the object group 26 include, for example, feature values of the objects 22 included in the object group 26 and the position of the object group 26 in the object queue 20. Here, the method of determining the position of the object group 26 is arbitrary. For example, the position of the object group 26 is defined as the position of any object 22 included in the object group 26. For example, the position of the object group 26 is defined as the position of the center of a plurality of objects 22 included in the object group 26.

Further, the change detection unit 2060 detects a change in the object queue 20 based on the element information and the detection result of the object group 26 to subsequent video frame 14 after the video frame 14 in which the element information is generated. The method of detecting the change in the object queue 20 based on the detection result of the object group 26 is similar to the method of detecting the change in the object queue 20 based on the detection result of the object 22. Therefore, the change detection unit 2060 detects that the head object group 26 left the object queue 20 in a case where following two conditions are satisfied: 1) the head object group 26 is not detected from the object area 24 of the object group 26, and 2) the object group 26 which is positioned at the second from the head enters the object area 24 of the head object group 26.

When the object group 26 is regarded as a formation unit of the object queue 20, the information processing apparatus 2000 detects each object group 26 from the video frame 14. For example, during the process of tracking the individual objects 22, if the information processing apparatus 2000 detects a plurality of objects 22 moving for a predetermined time or longer while keeping a predetermined distance or less of distance therebetween, the plurality of objects 22 are collectively detected as one object group 26. In this case, the information processing apparatus 2000 collects tracking information on the plurality of objects 22 to generate tracking information for the object group 26. The tracking information on the object group 26 includes, for example, information on a position and a state of the object group 26 in addition to the tracking information on each object 22 forming the object group 26.

Second Example Embodiment

Figure 15:
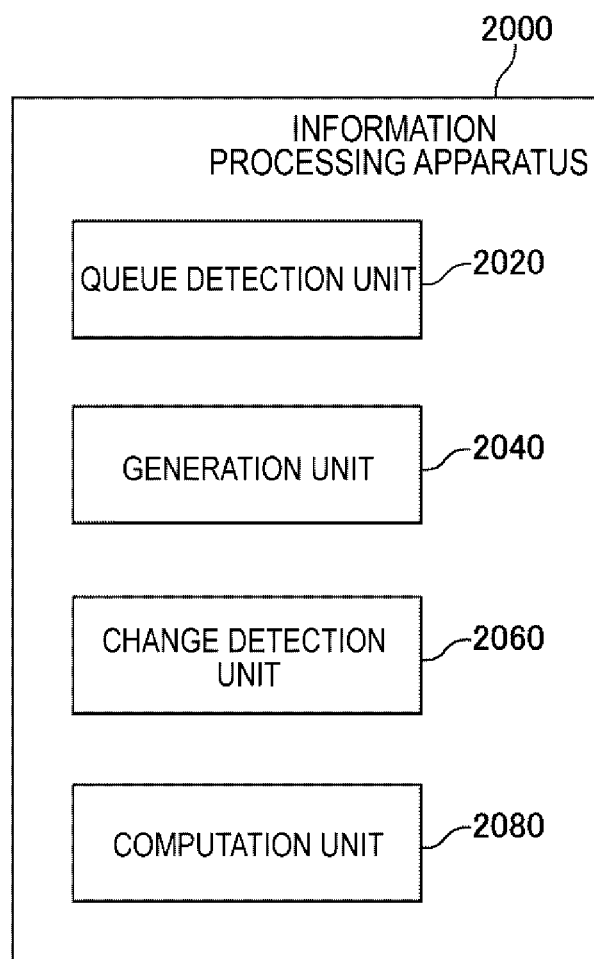
FIG. 15 is a block diagram illustrating an information processing apparatus according to the second example embodiment.

FIG. 15 is a block diagram illustrating an information processing apparatus 2000 according to the second example embodiment. Other than matters described below, the information processing apparatus 2000 according to the second example embodiment includes the same functions as the information processing apparatus 2000 according to the first example embodiment.

The information processing apparatus 2000 according to the second example embodiment includes a computation unit 2080. The computation unit 2080 computes a waiting time of the object queue 20. The waiting time of the object queue 20 represents a time which is estimated to be taken from when an object joins the tail part of the object queue 20 until when the object leaves the head of the object queue 20. For example, in the case where a queue of people in front of a ticket machine, the time estimated to be taken is a time taken from joining the queue to leaving the queue and becoming able to use the ticket machine.

The computation unit 2080 computes the waiting time of the object queue 20 by multiplying a predicted time during which the object 22 stay at the head of the object queue 20 (hereinafter, predicted staying time) by a length of the object queue 20. Here, the length of the object queue 20 at a time point is the number of object areas 24 indicated by most recently generated element information from the time point. For example, suppose that element information is computed at time points Ta, Tb, and Tc. In this case, the length of the object queue between the time points Ta and Tb is the number of object areas 24 indicated by the element information generated at the time point Ta. In addition, the length of the object queue 20 between the time points Tb and Tc is the number of object areas 24 indicated by the element information generated at the time point Tb.

Here, in a case where an object 22 leaves the object queue 20, the waiting time of the object queue 20 becomes short. However, if an object 22 has only temporarily left the object queue 20, the object 22 will return to the object queue 20 later, so the waiting time of the object queue 20 does not become short. Therefore, in a case where the object queue 20 leaves the object queue 20, it is preferable to be able to determine whether the leave is temporary or not.

In this respect, as described in the first example embodiment, in a case where the object 22 temporarily leaves the object queue 20, the change detection unit 2060 does not handle as that the object 22 left the object queue 20 and element information is not updated. Thus, even in a case where an object 22 temporarily leaves the object queue 20, the length of the object queue 20 is not decreased, so the waiting time of the object queue 20 does not become short as well. On the other hand, in a case where an object 22 left the object queue 20, the leave is detected and the element information is updated. Therefore, since the length of the object queue 20 specified by the element information is decreased, the waiting time of the object queue 20 is shortened.

As described above, according to the information processing apparatus 2000, even in a case where the object 22 temporarily leaves the object queue 20, without affected by that, the waiting time of the object queue 20 can be accurately computed.

<Method of Computing Predicted Staying Time>

In order to use in computation of the predicted staying time, the change detection unit 2060, which detects that the head object 22 left the object queue 20, writes a time point at which the head object 22 left the object queue 20 (hereinafter, head leaving time) into the storage device. For example, the head leaving point of an object 22 is defined as the generation time of the video frame 14 in which it is detected that the object 22 left the head of the object queue 20.

The computation unit 2080 computes the time (hereinafter, actual staying time) during which the object 22 actually stays at the head in the object queue 20 using the head leaving time. Specifically, the computation unit 2080 computes, as the actual staying time, the difference between the head staying time of an object 22 and the head staying time of the object 22 that left the head of the object queue 20 next.

For example, it is assumed that the object queue 20 is formed by three objects 22 arranged in order of the object 22-1, the object 22-2, and the object 22-3. Then, it is assumed that the objects 22-1 to 22-3 respectively leave the head of the object queue 20 at time points Ta, Tb, and Tc. In this case, the actual staying time of the object 22-2 is obtained by subtracting Tb from Ta, and the actual staying time of the object 22-3 is obtained by subtracting Tc from Tb.

The computation unit 2080 computes the predicted staying time using one or more actual staying times. For example, the computation unit 2080 sets the most recently computed actual staying time as the predicted staying time. In addition, for example, the computation unit 2080 computes a statistical value of a plurality of predicted staying times, and sets the statistical value as the predicted staying time. The statistical value is, for example, an average value, a maximum value, a minimum value, or the like. The actual staying time used for computing the statistical value may be all of the actual staying times computed for the object queue 20, or may be part of the actual staying times. In the latter case, for example, the computation unit 2080 computes a statistical value of a predetermined number of latest actual staying times.

<Uses of Computed Waiting Time>

There are various uses of the waiting time of the object queue 20 computed by the computation unit 2080. For example, the information processing apparatus 2000 writes the waiting time computed by the computation unit 2080 into a storage device. Accordingly, it is possible to recognize a pattern of the waiting time of the object queue 20 at a place where the camera 10 is installed by, for example, statistically computing a difference in the waiting time of the object queue 20 for each time slot, date, or day.

In addition, for example, the information processing apparatus 2000 may provide the waiting time of the object queue 20 computed by the computation unit 2080 using various methods. For example, the information processing apparatus 2000 displays the waiting time of the object queue 20 on a predetermined display device. For example, this predetermined display device is previously installed near the object queue 20. In addition, for example, the information processing apparatus 2000 may display the waiting time of the object queue 20 on a predetermined web page. By doing this, it becomes possible for a person who is going to join the object queue to determine whether to joins the object queue 20 after considering the accurate waiting time of the object queue 20.

<Example of Hardware Configuration>

A hardware configuration of the computer, which realizes the information processing apparatus 2000 according to the second example embodiment, is represented with reference to, for example, FIG. 4 as the same as in the first example embodiment. However, in the storage device 1080 of the computer 1000, which realizes the information processing apparatus 2000 according to the example embodiment, program modules (such as program modules realizing the computation unit 2080), which realize functions of the information processing apparatus 2000 according to the example embodiment, are further stored.

Modification Example

In the above description, the object 22 is used as a formation unit of the object queue 20. However, as described above as the modification example of the first example embodiment, the object group 26 may be a formation unit of the object queue 20.

In this case, the computation unit 2080 computes the time during which the object group 26 is predicted to stay at the head of the object queue 20 as the predicted staying time. A method of computing the predicted staying time of the object group 26 is the same as the method of computing the predicted staying time of the object 22.

Then, the computation unit 2080 computes the waiting time of the object queue 20 by multiplying the predicted staying time of the object group 26 by the length of the object queue 20. The length of the object queue 20 is represented by the number of object areas 24 indicated in the element information, that is, the number of object groups 26 included in the object queue 20.

The invention claimed is:

1. An information processing apparatus comprising:
  at least one memory configured to store instructions; and
  at least one processor configured to execute the instructions to:
    detect a queue of objects from video frame;
    generate, based on a plurality of the video frames detected the queue, an object area in the video frame occupied by the object included in the queue and a position information of the object in the queue; and
    detect that a first object leaves the queue in a case where the first object is not detected from the object area of the first object, it is detected that a second object enters into the object area of the first object, and it is detected that a third object is stationary, the first object having not been at ends of the queue, the second object having been at right behind the first object, the third object having been right before the first object.

2. The information processing apparatus according to claim 1, wherein the at least one processor is further configured to execute the instructions to:
  compute a staying time at an end of the queue for the object being positioned at the end; and
  compute a time obtained by multiplying the computed time by a length of the queue as a waiting time of the queue.

3. The information processing apparatus according to claim 2, wherein the at least one processor is further configured to execute the instructions to:
  compute, as the staying time of the object at the end of the queue, a time between when the object leaves the end of the queue and when another object subsequently leaves the end of the queue.

4. A control method executed by one or more computers, comprising:
  detecting a queue of objects from video frame;
  generating, based on a plurality of the video frames detected the queue, an object area in the video frame occupied by the object included in the queue and a position information of the object in the queue; and
  detect that a first object leaves the queue in a case where the first object is not detected from the object area of the first object, it is detected that a second object enters into the object area of the first object, and it is detected that a third object is stationary, the first object having not been at ends of the queue, the second object having been at right behind the first object, the third object having been right before the first object.

5. The control method according to claim 4, further comprising:
  computing a staying time at an end of the queue for the object being positioned at the end; and
  computing a time obtained by multiplying the computed time by a length of the queue as a waiting time of the queue.

6. The control method according to claim 5, further comprising:
  computing, as the staying time of the object at the end of the queue, a time between when the object leaves the end of the queue and when another object subsequently leaves the end of the queue.

7. A non-transitory storage medium storing a program causing a computer to execute a control method, the control method comprising:
  detecting a queue of objects from video frame;
  generating, based on a plurality of the video frames detected the queue, an object area in the video frame occupied by the object included in the queue and a position information of the object in the queue; and
  detect that a first object leaves the queue in a case where the first object is not detected from the object area of the first object, it is detected that a second object enters into the object area of the first object, and it is detected that a third object is stationary, the first object having not been at ends of the queue, the second object having been at right behind the first object, the third object having been right before the first object.

8. The non-transitory storage medium according to claim 7, wherein the control method further comprises:
  computing a staying time at an end of the queue for the object being positioned at the end; and
  computing a time obtained by multiplying the computed time by a length of the queue as a waiting time of the queue.

9. The non-transitory storage medium according to claim 8, wherein the control method further comprises:
  computing, as the staying time of the object at the end of the queue, a time between when the object leaves the end of the queue and when another object subsequently leaves the end of the queue.

* * * * *